United States Patent [19]

Davey

[11] 4,247,040
[45] Jan. 27, 1981

[54] METHOD AND MECHANISM FOR SWITCHING HEAT GENERATING EQUIPMENT

[75] Inventor: William E. Davey, Wellington, New Zealand

[73] Assignee: A & T Burt Limited, Lower Hutt, New Zealand

[21] Appl. No.: 43,015

[22] Filed: May 29, 1979

[30] Foreign Application Priority Data

Jul. 3, 1978 [NZ] New Zealand .......................... 187757

[51] Int. Cl.³ .............................................. F23N 5/20
[52] U.S. Cl. ................................... 236/46 R; 236/68 B
[58] Field of Search ............. 236/46 R, 68 B; 165/12; 62/233

[56] References Cited

U.S. PATENT DOCUMENTS

| | | | |
|---|---|---|---|
| 3,361,348 | 1/1968 | Salerno | 236/68 B |
| 4,172,555 | 10/1979 | Levine | 236/46 R |
| 4,186,874 | 2/1980 | Jensen | 236/46 R |

*Primary Examiner*—William E. Wayner
*Attorney, Agent, or Firm*—Bucknam and Archer

[57] ABSTRACT

A control method and mechanism for switching heat generating equipment which requires the steps of:

positioning a control box containing a block positioned within an insulating material in association with a building;

maintaining the block within the control box at a first pre-set temperature (T1) during shut down conditions of a heating system incorporated within the building and which is to be operated by the control box;

deactivating at a pre-determined period prior to the time the building is to be occupied a heater which has maintained the block at its pre-determined temperature;

allowing the block to cool to a pre-determined temperature (T2); and activating a main control mechanism or switch of the heating system when the block has cooled to the pre-determined temperature (T2) so that the building is heated to reach a desired temperature at start time for use of the building.

The pre-determined period is dependent upon the thermal properties of each building and the output of the heating equipment employed in the building. By varying either the pre-determined period and the preset temperature T1, the construction of the building, or the output of the heating equipment employed therein, a varying heating up time can be obtained to suit a particular building.

10 Claims, 5 Drawing Figures

METHOD AND MECHANISM FOR SWITCHING HEAT GENERATING EQUIPMENT

FIELD OF THE INVENTION

This invention relates to a method and mechanism for switching heat generating equipment, and more particularly relates to a method and mechanism for controlling a heating system of a building.

DESCRIPTION OF THE PRIOR ART

In the past known control circuits and mechanisms used for switching on heating systems of buildings have generally been activated by a time clock which automatically switches on the heating system at a pre-set time or at a pre-determined period prior to the time at which the building is normally to be occupied.

Such known control circuits generally activate a boiler or other heating system so that prior to the time at which the building is to be occupied the boiler is in operation to heat the building to a pre-determined temperature.

A disadvantage of such known control circuits is that no account is taken of the initial ambient temperature within the building or surrounding the building. A waste in fuel costs occurs when the building's internal temperature reaches the pre-determined temperature early when the building is not occupied. This generally occurs when the ambient temperature is high as it takes less time and fuel to heat the building than during cold periods.

This waste in fuel costs when spread over a full winter increases fuel bills considerably and it is an object of the present invention to overcome this disadvantage and to provide a control method and mechanism which governs the operation of a heating system depending upon the ambient temperature prior to the initial starting of the heating system.

A further object of the present invention is to minimize fuel expense required to operate a heating system of a building.

Further objects and advantages of the present invention will become apparent from the following description which is given by way of example only of the present invention.

SUMMARY OF THE INVENTION

According to a first aspect of the present invention there is provided a control method which comprises the steps of:
positioning a control box containing a block positioned within an insulating material in association with a building;
maintaining the block within the control box at a first preset temperature (T1) during shut down conditions of a heating system incorporated within the building and which is to be operated by the control box;
deactivating at a pre-determined period prior to the time the building is to be occupied a heater which has maintained the block at its pre-determined temperature;
allowing the block to cool to a pre-determined temperature (T2); and
activating a main control mechanism or switch of the heating system when the block has cooled to the pre-determined temperature (T2) so that the building is heated to reach a desired temperature at start time for use of the building.

The pre-determined period is dependent upon the thermal properties of each building and the output of the heating equipment employed in the building. By varying either the pre-determined period and the preset temperature T1, the construction of the building, or the output of the heating equipment employed therein a varying heating up time can be obtained to suit a particular building.

According to a second aspect of the present invention there is provided a control mechanism for a heating system of a building, the mechanism comprising a control box having therein a block supported within an insulation material, the block being maintained by a heater at a pre-set temperature (T1) during shut down conditions of a heating system of the building, a timing device arranged so that at a pre-determined period prior to the time the building is to be occupied the heater which has kept the block at the temperature (T1) is switched off so that the block cools until it reaches a pre-determined temperature (T2) at which temperature (T2) a main control switch of the heating system is activated to heat the building to a desired temperature at start time for use of the building.

The pre-determined period being variable and dependent upon the thermal properties and heating equipment employed within the building so that by varying the pre-determined period and temperature (T1) a different heating up time can be obtained to suit a particular building.

If the heating up time of the building is reduced, in practice it would be necessary to reduce the pre-set temperature (T1).

Further aspects of the present invention which should be considered in all its novel aspects will become apparent from the following description which is given by way of example only of the present invention.

BRIEF DESCRIPTION OF THE DRAWINGS

An example of control box according to the present invention will now be described with reference to the accompanying drawings in which.

DESCRIPTION OF THE PREFERRED EMBODIMENT

A control mechanism according to the present invention can be utilized in any building, for example an industrial building, school, office block or hotel in which buildings' heat is generally only required during the day, for example, heat is normally required between 8 a.m. and 5 p.m. on weekdays.

The building can include any type of heating system, for example a coal, gas or oil-fired boiler or heater or an electrical heating system and the control mechanism according to the present invention is connected thereto to activate the heating system to ensure that the temperature within the building is at a desired comfortable usable temperature from the initial start time (for example, 8 a.m.) of workers using the building.

Figure 1:
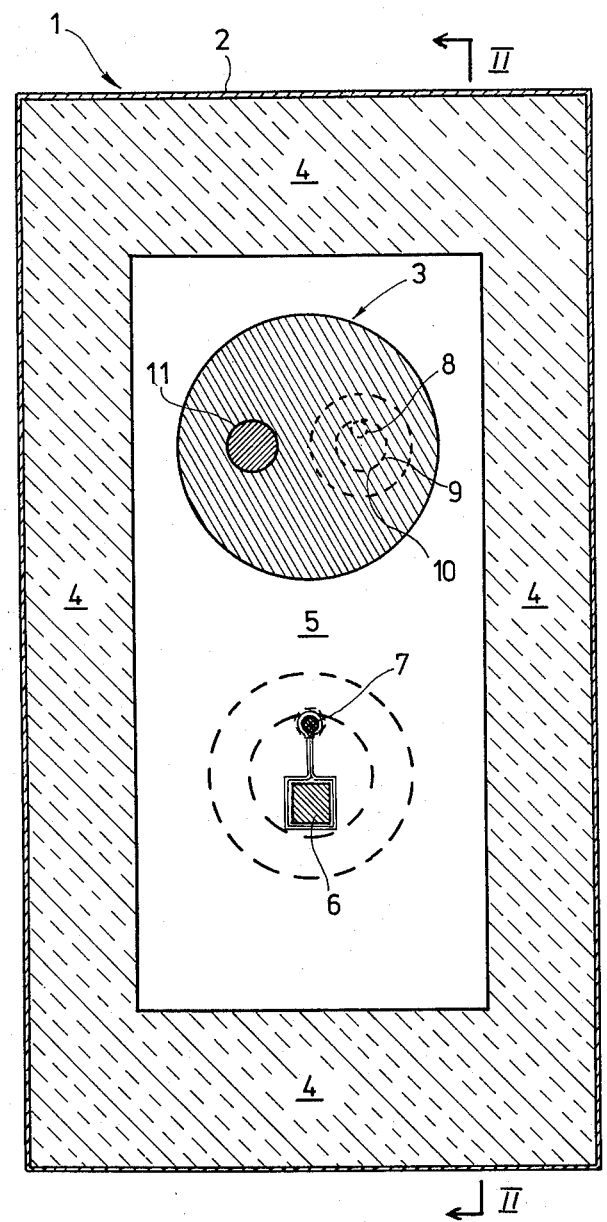
FIG. 1 is a cross section through a control mechanism according to the present invention.
Figure 2:
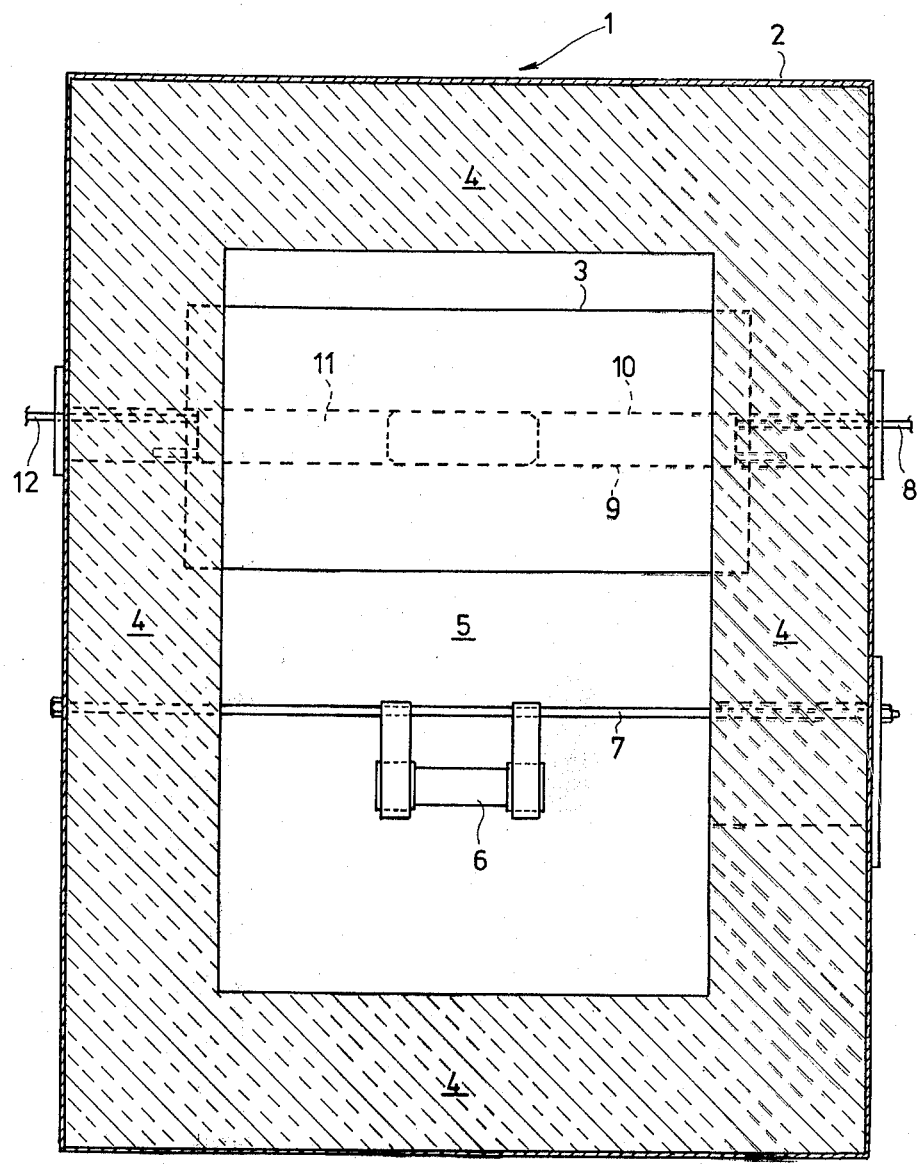
FIG. 2 is a section through the control mechanism shown in FIG. 1 taken on the lines II—II.

The control mechanism shown in FIGS. 1 and 2 is generally mounted in a control box 1 mounted within the building so that the outer casing 2 thereof is at the ambient temperature within the building.

The control box 1 can be constructed from any suitable material and has mounted therewithin a block generally indicated by arrow 3 which is mounted in an insulation material 4.

The insulation material 4 is polystyrene and alternatively can be other foamed plastics material or other insulation materials if desired.

The block 3 can be a block of mild steel or another metal material. Alternatively the block 3 can be one or more building bricks. The feature of the block 3 is that it must be constructed of a material having a relatively high specific heat coefficient.

The insulation material 4 supports the ends of the block 3 and has formed in the middle thereof an air space generally indicated by arrow 5 within which is mounted a heater 6 which can be constructed in any suitable manner. The heater 6 is a suitably mounted and insulated resistor supported within the air space 5 on a rod 7. Alternatively the heater 6 can be another heat generating source, for example, a light bulb. The heater 6 is controlled so that it heats the air space 5 and the block 3 and maintains them at a preset temperature (T1) during the periods in which the main heating system of the building is shut down, for example, overnight or during weekends.

The heater 6 is controlled by a thermostat (not shown in FIGS. 1 and 2 but referred by numeral 13 in FIG. 5) which is connected by a capillary 8 to a remote sensing bulb 9 mounted in a recess 10 formed in the block 3. The remote sensing bulb 9 extends, in the recess 10, into the centre of the block 3 and is fixed therein.

Figure 5:
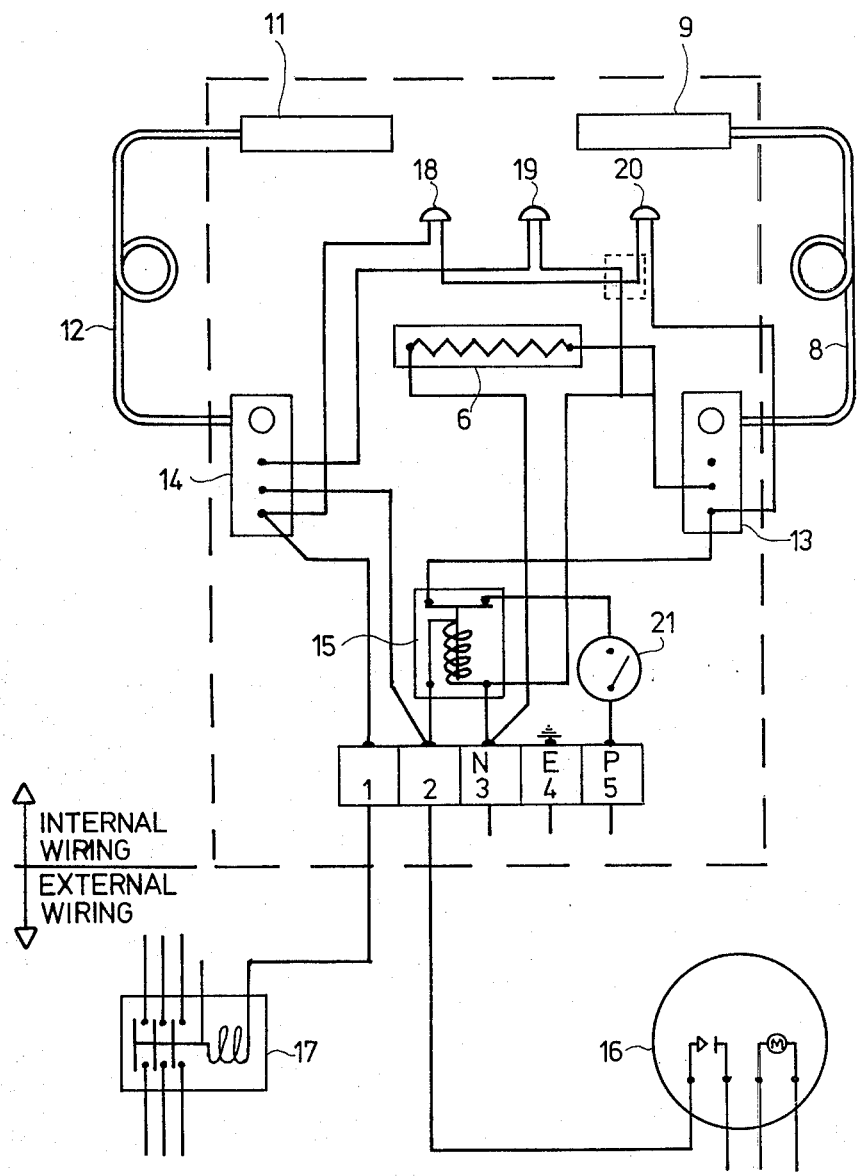
FIG. 5 is a circuit diagram showing the manner in which the control mechanism can be connected to a heating system in order to operate the heating system.

In addition to the remote sensing bulb 9 the block 3 has mounted therewithin a second remote sensing bulb 11 connected to a capillary 12 which is connected to a second thermostat (not shown in FIGS. 1 and 2 but referred by numeral 14 in FIG. 5) which is fitted therewithin in the same manner as the thermostat 13 and is connected and set so that when the temperature of the block 3 cools to a pre-determined temperature (T2) the second thermostat 14 operates to make the circuit of a main heating unit for the building through the relay 15 (shown in FIG. 5).

The pre-determined temperature (T2) is selected to suit the particular construction and heating equipment employed in a building.

The thermostats 13 and 14 are selected so that they have good repeatability and are operated on small differentials. For example, they should be accurate to plus or minus 1 degree C.

The control circuit shown in FIG. 5 can also include indicators 18, 19 and 20 which show the current condition of the control mechanism.

The indicator 18 operates when the control mechanism has switched on the main heating system of the building.

The indicator 19 operates when the control mechanism is during its delay period while the block 3 is cooling between temperature T1 and T2.

The indicator 20 operates during shut down conditions of the heating system, for example, overnight or during weekends.

In use, at a pre-determined period X prior to the start time for use within a building, a time clock (16 in FIG. 5) switches off the heater 6 and this allows the block 3 to cool until it reaches the temperature (T2) at which temperature the second thermostat 14 activates a load contactor 17 (FIG. 5) for the building's heating system.

The pre-determined period X is dependent upon the thermal properties of the particular building and heating equipment employed therein and it has been found during experiments that for a building requiring a heating up period of four hours the temperature (T1) should be selected at about 31° C. The thermostat 13 is connected to maintain the temperature within the block 3 at this temperature (T1) during shut down periods and weekends. At a pre-determined period X of say six hours before the time the building is required the time clock 16 switches off the heater 6 and the block 3 gradually cools until it reaches the pre-determined temperature (T2) of about 21° C. and at that time the second thermostat 14 is activated to switch on the main heating system to give a heating up period which ensures that the desired temperature is reached at the start time for the building.

It is to be appreciated that the control mechanism according to the present invention includes such safety devices as are required by law, for example, an isolating switch 21 should be included.

If the ambient temperature within or surrounding the building is high then the cooling rate will slow so that depending on the ambient temperature the period of heating up will increase or decrease to suit.

It has been found that if the final operating temperature (T) for within the building is reduced then the heating up time reduces and accordingly the pre-determined period X must be reduced to suit.

Figure 3:
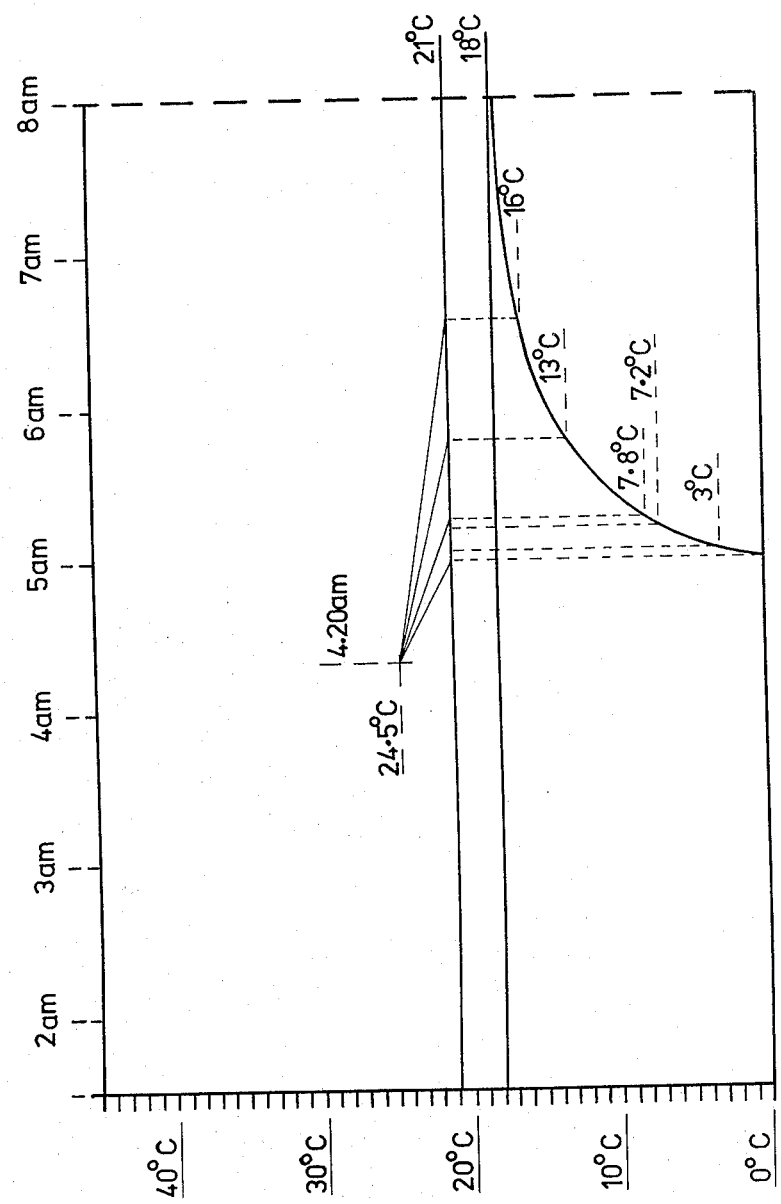
FIG. 3 is a graph showing the heating up curve of a building with a three hour heating up time showing a variety of ambient temperatures and the start times at which a control box according to the present invention switches on the main heating unit of a building.
Figure 4:
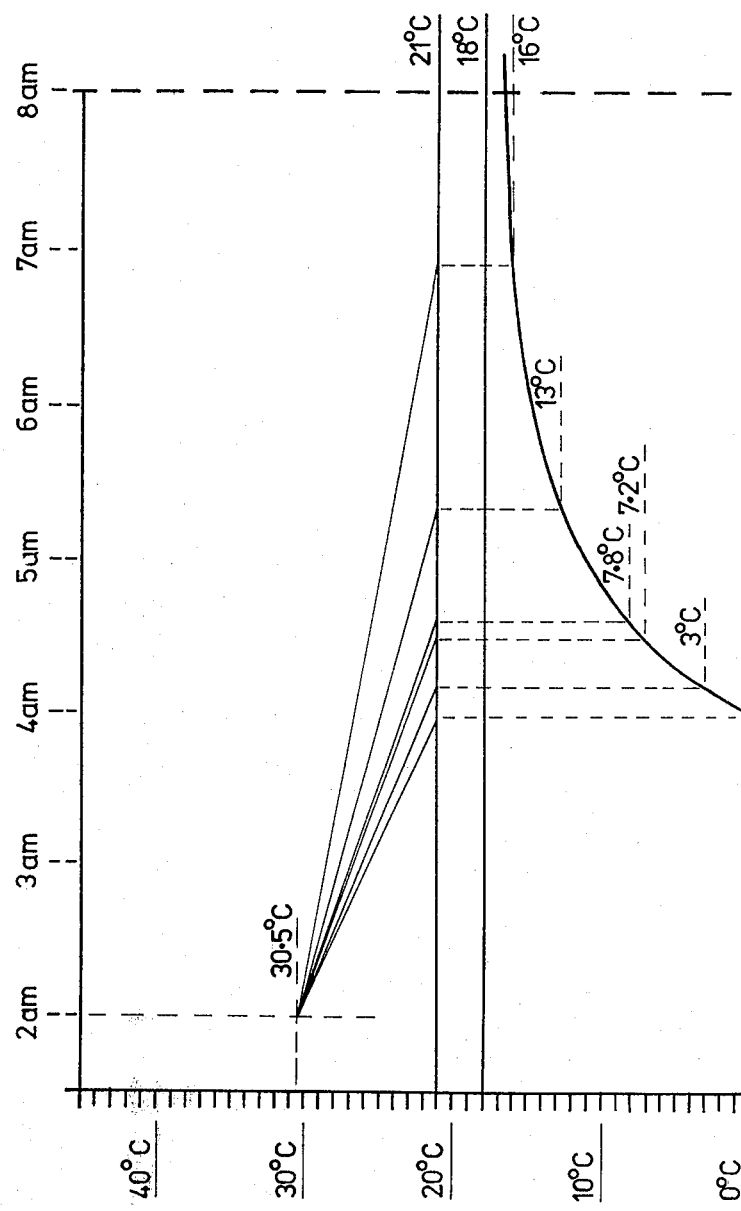
FIG. 4 is a graph similar to that shown in FIG. 3 but showing the heating up curve of a building having a four hour heating up time.

The results of tests effected by the Department of Scientific and Industrial Research are available and shown in FIGS. 3 and 4. In both figures they show a comparison between the calculated theoretical heating up times for a building and the actual switching on times during tests.

The graphs shown in FIG. 4 show a heating up curve for a building having a four hour heating up time. The building being due to be occupied at 8 a.m. This is the start time and in the tests the pre-determined period X prior to this time was six hours, that is the time clock 16 switched off the heater 6 in the control box 1 at 2 a.m.

The temperature (T1) was selected at about 30.5° C. and this is the temperature at which thermostat 13 maintained the block 3 prior to the switch off time of 2 a.m. when the heater 6 within the control unit was deactivated.

The outside or ambient temperatures are as represented and the curves show the rate of cooling at those temperatures. Thus it can be seen that with the temperature (T2) set at 21° C. the start time varies depending upon the outside ambient temperatures shown so that an increased or decreased heat up is required as shown. This start up time is the time that the temperature within the control box 1 cools to (T2) and it can be seen that if the outside ambient temperature is 16° C. then the heating system will only start at 7 o'clock as it has taken from 2 a.m. till 7 a.m. for the control box 1 to cool to the temperature of 21° C. If the inside building ambient temperature is at freezing point then the full four hours heating up period is required in order to reach the required start temperature.

The graph shown in FIG. 3 shows a heating up curve for a building having a three hour heating up time and this shows both theoretical and test results in a similar manner to those described hereinbefore with reference to FIG. 4. The advantages of the present invention can be seen from these graphs which show the late times at which the heating system for the building starts and this can involve over a period a considerable saving in fuel costs.

Thus by this invention there is provided a control mechanism and method which is economic to manufacture and which results in a considerable saving in fuel costs.

A particular example of the present invention has been described by way of example and it is envisaged that modifications to and variations of the invention can take place without departing from the scope of the appended claims.

What we do claim and desire to obtain by Letters Patent of the United States of America is:

1. A control method which comprises the steps of:
    positioning a control box containing a block, positioned within an insulating material, in association with a building;
    maintaining the block within the control box at a first preset temperature (T1) during shut down conditions of a heating system incorporated within the building and which is to be operated by the control box;
    deactivating at a pre-determined period prior to the time the building is to be occupied a heater which has maintained the block at its pre-determined temperature;
    allowing the block to cool to a pre-determined temperature (T2); and
    activating a main control mechanism or switch of the heating system when the block has cooled to the pre-determined temperature (T2) so that the building is heated to reach a desired temperature at start time for use of the building.

2. A control method as claimed in claim 1 wherein the pre-determined period is dependent on the thermal properties of the building.

3. A control mechanism for a heating system of a building, the mechanism comprising a control box having therein a block supported by, in or within an insulation material, the block being constructed from a material having a relatively high specific heat coefficient and being maintained by a heater at a preset temperature (T1) during shut down conditions of a heating system of a building, a timing device arranged so that a pre-determined period prior to the time the building is to be occupied the heater which has kept the block at the temperature (T1) is switched off so that the block cools until it reaches a pre-determined temperature (T2) at which temperature (T2) a main control switch of the heating system is activated to heat the building to a desired temperature at start time for use of the building.

4. A control mechanism as claimed in claim 3 wherein the pre-determined period is varied depending upon the thermal properties of the building and the heating unit or equipment therein so that by varying the pre-determined period a different heating up time can be obtained to suit a construction of building.

5. A control mechanism as claimed in claim 3 wherein the insulation material which supports the ends of the block is polystyrene or another foamed plastics material.

6. A control mechanism as claimed in claim 3 wherein the insulation material has formed in the middle thereof an air space in which a portion of the block is sited.

7. A control mechanism as claimed in claim 3 wherein the heater is mounted within an air space in the middle of the insulation material so as to heat the air space and block during any period in which the main heating system is shut down.

8. A control mechanism as claimed in claim 5 wherein the heater is controlled by a thermostat which is connected via a capillary to a remote sensing bulb situated within the block.

9. A control mechanism as claimed in claim 3 wherein the heater is controlled by a thermostat which is connected via a capillary to a remote sensing bulb situated within the block, a second thermostat being situated within the block to sense the pre-determined temperature (T2), the second thermostat is connected via a capillary to a remote sensing bulb.

10. A control mechanism as claimed in claim 3 wherein the heater is controlled by a thermostat which is connected via a capillary to a remote sensing bulb situated within the block, the operation of the thermostat is controlled by a time clock such that after the thermostat has been switched off the block cools to the temperature (T2) at which temperature (T2) a second thermostat operates a load contactor of the heating system of the building.

* * * * *